July 31, 1951 H. T. FAUS 2,562,707

STYLUS FOR MAGNETIC RECORDING AND REPRODUCING APPARATUS

Original Filed Jan. 9, 1945 2 Sheets-Sheet 1

Inventor:
Harold T. Faus,
by Merton D. Moore
His Attorney.

July 31, 1951 H. T. FAUS 2,562,707

STYLUS FOR MAGNETIC RECORDING AND REPRODUCING APPARATUS

Original Filed Jan. 9, 1945 2 Sheets-Sheet 2

Inventor:
Harold T. Faus,
by Merton D. Morse
His Attorney.

Patented July 31, 1951

2,562,707

UNITED STATES PATENT OFFICE 2,562,707

STYLUS FOR MAGNETIC RECORDING AND REPRODUCING APPARATUS

Harold T. Faus, Lynn, Mass., assignor to General Electric Company, a corporation of New York Original application January 9, 1945, Serial No. 572,034. Divided and this application October 5, 1946, Serial No. 701,608

5 Claims. (Cl. 274—38)

My invention relates to magnetic recording and reproducing apparatus and to methods for making the same, and to processes and apparatus for recording and reproducing desired signals, such as sound or the like, upon magnetizable record media having extended surfaces, such as disks, cylinders, cones, or the like. More particularly the invention relates to needles or styluses adapted to use in magnetic recording and reproducing.

This is a division of my copending application Serial No. 572,034, filed January 9, 1945, now Patent No. 2,532,803, issued December 5, 1950, and assigned to the same assignee as the present invention.

It is a general object of my invention to provide a new and improved, and particularly a practical and inexpensive, magnetic recording and reproducing apparatus.

A more particular object of the invention is to provide new and improved needles or styluses for magnetic recording and reproducing.

It is a still further object of my invention to eliminate cross talk or interference from adjacent sound tracks in magnetic recording and reproducing apparatus of the disk or sheet type.

It is still another object of the invention to provide a new and improved magnetic recording needle or stylus.

Figure 1:
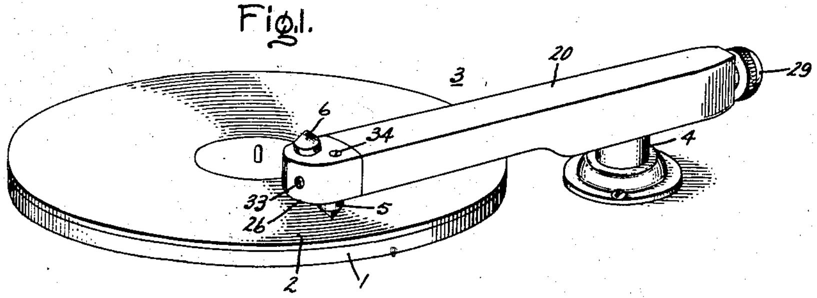
Figure 2:
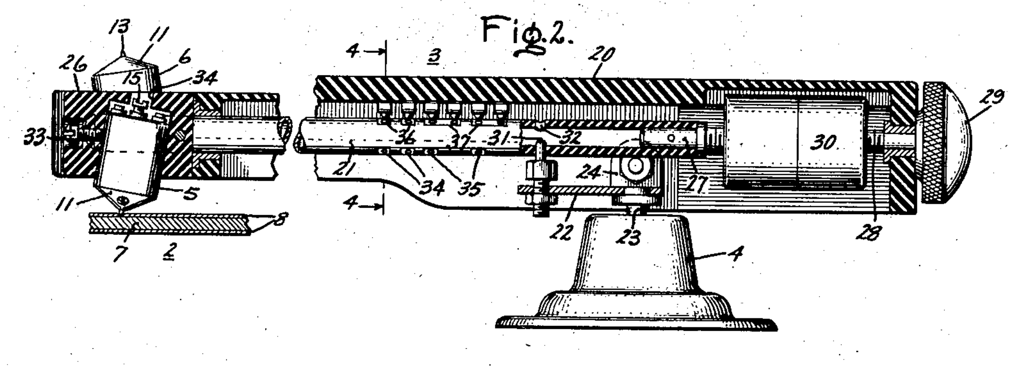
Figure 3:
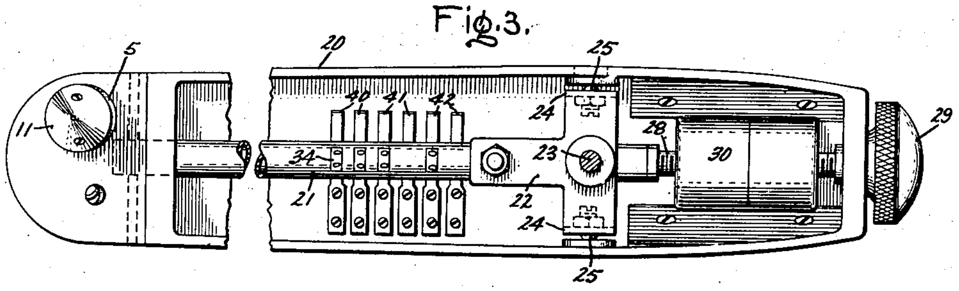
Figure 4:
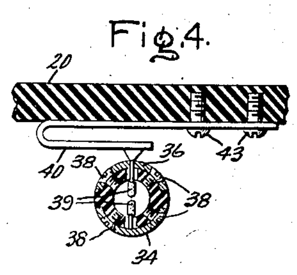
Figure 7:
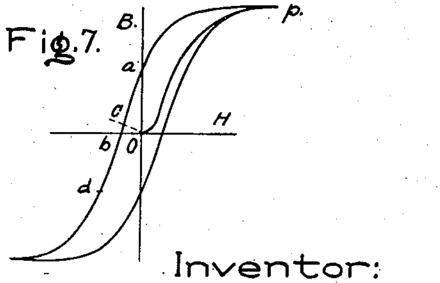
Figures 5, 6, 8, 9, 10:
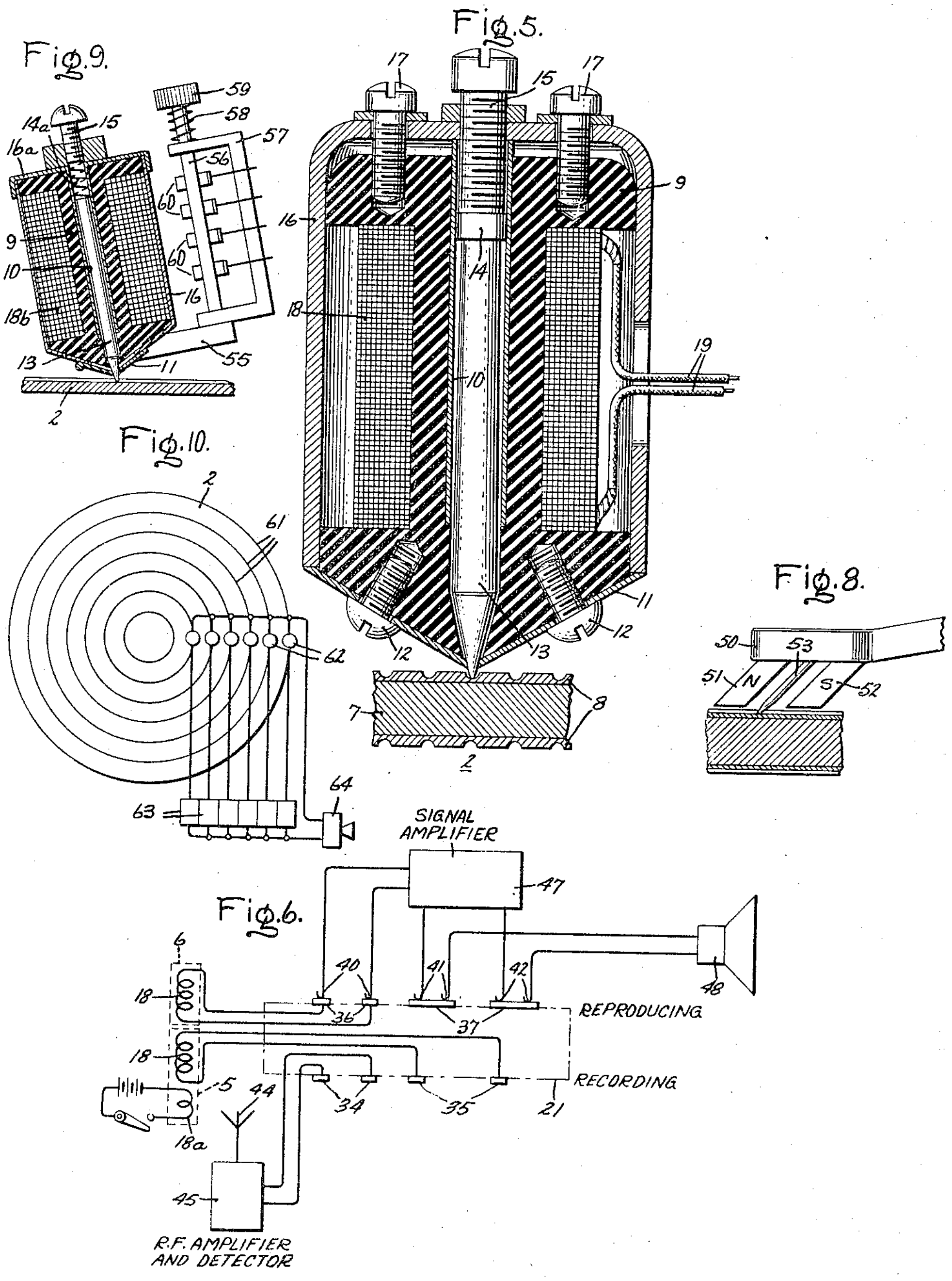

My invention will be more fully understood and its various objects and advantages further appreciated by referring now to the following detailed specification taken in conjunction with the accompanying drawings, in which Fig. 1 is a perspective view of a magnetic recording and reproducing apparatus embodying my invention; Fig. 2 is a cross-sectional view of the movable arm assembly including the recording and reproducing heads; Fig. 3 is a bottom view of the arm assembly; Fig. 4 is a cross-sectional view of the arm taken along the line 4—4 of Fig. 2; Fig. 5 is a cross-sectional view of a recording or reproducing head and a portion of the record sheet; Fig. 6 is a schematic circuit diagram, partially in block form, of a complete magnetic recording and reproducing system embodying my invention; Fig. 7 is a graphical representation of certain of the magnetic characteristics of the record medium; Fig. 8 is a side elevation of a magnetic erasing head embodying my invention; Fig. 9 is a cross-sectional view of a combined recording and reproducing head; and Fig. 10 is a diagrammatic representation of a musical instrument including my new and improved magnetic recording and reproducing apparatus.

Referring now to the drawings, I have shown at Fig. 1 a disk recording apparatus comprising a rotatable turntable 1 carrying a record sheet or disk 2 and a movable arm 3 rotatably and pivotally mounted upon a base 4 and carrying at its end a reversible portion in opposite sides of which are mounted recording and reproducing heads 5 and 6, respectively, in position alternatively to engage the record disk 2.

The recording medium 2 is shown in greater detail at Fig. 5 and comprises a disk-shaped supporting sheet 7 of homogeneous magnetizable material, such as soft iron or the like, having a relatively low reluctance and coated on each side with a thin layer 8 of magnetizable material having a relatively high reluctance and high coercive force. It will of course be understood that it is not necessary that both surfaces of the supporting disk 7 be coated, but that, if desired, only one surface need be coated.

The high coercive force surface layers 8 are of uniform thickness and comprise a pulverized mixture of magnetizable metallic oxides dispersed in a pliable organic binder, such as a resinous, cellulose or other plastic material. Any of the well known thermosetting or thermoplastic materials, such as Bakelite and Vinylite, are well suited for the binder.

I have found that the oxides of certain metals are particularly well adapted, by reason of their particular magnetic properties, for dispersion in the binder to form a recording coating. Preferably, several such oxides are mixed together and pressed into a sintered mass before grinding into a fine powder. One suitable material of this character is provided by mixing together finely powdered magnetite, ferric oxide, and cobaltic oxide in the proportions of 43.6% magnetite, 30.1% ferric oxide, and 26.3% cobaltic oxide. The mixture is then molded to the shape desired under pressure of from three to five tons per square inch. After molding, the material is removed from the mold and heated in an atmosphere of nitrogen or air for two or three hours at about 1000° C. and allowed to cool. After cooling, the material is ground to a fine powder in which the size of all the particles is appreciably less than the desired thickness of the coating 8. I have obtained excellent results with a coating 8 of about .004 inch in thickness, so that the powdered mixture should be ground to a fineness of .0025 inch or less, and preferably less than .0001 inch.

The powdered magnetic oxide mixture prepared as above is then mixed with a suitable resinous or other plastic binder, for example Vinylite, preferably in the proportion of about 100 to 200 grams of the powdered oxide to one pint of the fluid plastic. This viscous mixture is then sprayed or brushed upon the magnetic record base 7 to approximately the thickness desired. I have found, however, that in order to prevent peeling off of the oxide layer, it is necessary that the surface of the base disk 7 be treated prior to coating to increase its adhesion for the plastic binder, such as by bonderizing or the like.

After applying the magnetic coating to the record base 7, the coated record is heated sufficiently to drive out any solvents present in the binder and then allowed to cool. When a thermoplastic binder, such as Vinylite, is used, this pre-heating may take place at about 130° C. for about four hours. In the event that a thermosetting plastic is used, it may be necessary to use a lower temperature and a longer time so that the plastic does not take a permanent set.

After the solvents have been driven off, the record is placed in a mold under pressure in order to shape the record surface as desired. A thermoplastic record must be heated while in the mold to soften the surface and then allowed to cool and set under pressure. A thermosetting material must be heated in the mold so that setting will occur under pressure. I have found that ordinarily a pressure of about 1000 pounds per square inch is necessary to effect proper molding operation.

Preferably, the record mold includes a matrix formed to provide in the recording surface a guiding path, such as a groove or the like, for guiding a recording and reproducing needle. Ordinarily, the guiding path or sound track will be in the form of a continuous spiral having a plurality of closely adjacent and substantially parallel convolutions. It will be understood, however, that if desired the record may be formed with a plurality of separate paths, such as separate concentric circles or separate concentric spiral paths. When the recording surface 8 is .004 inch in thickness, the record groove may suitably be of semicircular cross section with a radius of approximately .0015 to .002 inch and a spacing between grooves of approximately .01 to .015 inch.

It will of course be understood by those skilled in the art that, while it is desirable to form a sound track upon the record surface itself, it is also possible to provide other means, such as a threaded shaft or the like, for guiding the recording and reproducing head in traversing the surface of an ungrooved record.

As described in my Patent 2,248,616, issued July 8, 1941, the sintered mixture of magnetizable oxide described above has highly desirable properties for the purpose here intended. Such material has a coercive force between 700 and 1000 oersteds, a permeability of the order of 1 to 6, and a residual induction of about 2000 lines per square centimeter. The mixture of oxide and binder has a still lower combined permeability. Moreover, the hysteresis loop of the oxide mixture differs from those of known metals and alloys in that it evidences a greater linearity over a wide range of magnetizing forces both upon the rising and the falling portions of the hysteresis curve. The oxide has an electrical resistance between 600,000 and 1,000,000 ohms per cubic centimeter, and is thus practically an insulator. The material is of a gray slate color and, while hard, it is considerably more friable than known magnetic metals or alloys. It is also very light in weight as compared with other magnetic materials, having a specific gravity of approximately one-half that of ordinary steel.

The magnetic record base 7 is formed of a material having a higher permeability and lower coercive force than the surface coating material. Preferably the base 7 has a permeability of about 1000 and at least in excess of 500. Suitable materials for the base 7 are soft iron or steel, such as cold rolled steel or silicon steel. I have found that silicon steel is preferable by reason of its relatively high electrical resistance. It will of course be understood that high resistance in both the base 7 and the surface coating 8 is desirable in order to minimize eddy currents in both portions of the recording medium. The record base 7 may suitably have a thickness of approximately .03 inch, although of course bases of greater thickness may be used if desired.

At Fig. 7, I have shown a magnetic hysteresis loop illustrative of certain of the magnetic properties of my record coating 8. In this figure, H represents magnetizing force and B represents the density of magnetization of the material. The curve O*p* represents the manner in which the magnetization increases from zero upon the application of a substantially saturating magnetizing force, and the curve *pab* represents the manner in which the magnetization is brought back to zero by removing and then reversing the magnetizing force. The ordinate O*a* represents the residual induction or retentivity of the material, while the abscissa O*b* represents the coercive force.

As will be more fully described hereinafter, the record surface is magnetized by a needle in the recording head 5 which traverses the surface of the record along a spiral path defined by the grooved surface. The lines of force from the needle, the magnetization of which is modulated in accordance with a desired signal, pass through the retentive coating 8 and into the record base 7. Upon removal of the magnetizing needle from any predetermined spot on the record, the base 7, being of low coercive force, loses substantially all of its magnetism at the point beneath that spot, while the coating 8 being of high coercive force retains the impressed magnetization. From Fig. 7, it will be evident that it is possible to carry out this recording operation either upon the portion O*p* of the curve or upon the portion *ad*, depending upon whether the record before the impression of the signal magnetization was in an unmagnetized state or was uniformly magnetized in one direction. In either case, it is desirable to provide the recording head with a unidirectional magnetic bias, as by direct current or the like. For recording upon the rising portion O*p* of the curve of Fig. 7, such unidirectional bias avoids the nonlinear portion of the curve adjacent the zero point O. The purpose of a unidirectional bias, when recording upon the portion *ad* of the curve, will be more fully explained hereinafter.

If the record surface is uniformly magnetized to the saturation value *p* prior to recording, the magnetization will, upon removal of the uniform magnetizing force, decrease to some value, such as *c*, on the portion *ab* of the curve. Such reduction of the magnetization below the residual value O*a* results from the high self-demagnetizing effect of the thin sheet 8 magnetized in the direction of its thickness. Because of this effect, it will be observed that the suitability of the magnetic oxide for the record surface resides more in its high coercive force than in its retentivity. So long as the coercive force is appreciably greater than the self-demagnetizing effect, materials having retentivities varying over wide limits will be seen to be equally suitable for the record surface. Moreover, it is the self-demagnetizing effect of the record which renders it necessary to provide a unidirectional magnetic bias when working upon the portion *ad* of the hysteresis loop. Without such unidirectional bias, the positive portions of the signal wave would have no effect. By unidirectional bias a further demagnetizing effect is impressed upon the record, so that the signal magnetization varies about a mean value somewhat lower than the value *c* shown at Fig. 7.

The recording and reproducing heads 5 and 6 are of similar structure, and one such head is shown at Fig. 6 of the drawing. Preferably, the recording and reproducing heads are not identical in practice, and the differences in the preferred forms of the heads will be made clear as the description proceeds. In each case, the head comprises a coil spool 9 of non-magnetic insulating material having an axial bore therethrough lined with a thin tube 10 of suitable magnetizable material, such as Permalloy, Nicaloi or Numetal having a relatively high permeability and low coercive force. The end flange of the coil spool 9 adjacent the record surface is conically flared externally to provide a seat for a conically flared end plate 11 of magnetizable material, apertured at its apex and held in place by bolts 12. The function of the end shield 11 in reproducing operation will be described in greater detail hereinafter. In the recording head the magnetizable shield 11 is preferably omitted, but may be included if very thin and easily saturable.

The axial bore in the coil spool 9 is tapered toward a small diameter aperture at the apex of the conical end flange in order to accommodate a tapered needle 13. The pointed tip of the needle projects through the end of the coil spool and through the aperture in the apex of the end shield 11 into engagement with the bottom of the spiral groove in the record surface. Where no end shield 11 is provided, as in a recording head, the tapered end of the needle seats upon the tapered end of the spool bore. Where a magnetic shield 11 is used, as in a reproducing head, it is necessary that the point of the needle be closely and uniformly spaced from the shield. Such spacing may, if desired, be obtained by accurate machining, with the needle seating upon the internally tapered spool body. I have found however that, in practice, it is desirable to allow the needle to seat upon the end shield 11 itself, as shown at Fig. 5, with a thin uniform non-magnetic spacer, such as a coating of varnish or the like, between the needle and the end shield.

Where the sound track groove has a cross-sectional radius of about .0015 inch as previously described, the radius of the tip of the needle 13 is preferably of the order of .001 inch.

The needle 13 is formed of any suitable highly permeable magnetizable material and, preferably, of a material having a relatively high electrical resistance and low coercive force. Such a material may, for example, be an alloy of 6% silicon and the balance iron, or an alloy of 9.6% silicon, 5.4% aluminum and the balance iron. In a preferred form of my invention the tip of the needle is chromium plated to increase its resistance to wear and, after such plating, the tip of the needle is dipped in varnish to provide the small uniform permanent air gap between the needle tip and the magnetic shield 11 of the reproducing head. It will of course be understood by those skilled in the art that the above illustrative composition of the needle 13 is not to be regarded as limiting in respect to my invention, but that other materials which are magnetically soft and mechanically hard will be found equally suitable. For example, surface hardness at the needle tip may be attained by nitriding the point of the needle.

The needle 13 is of such diameter that it is freely slidable but not excessively loose within the tube 10, and seats at the bottom either against the tapered end of the axial bore in the spool 9 or against the end shield 11, as preferred. The head of Fig. 5 is preferably a reproducing head, and the needle is shown seated against the end shield 11. At its upper end the needle is firmly held in place against its seat by a set screw 15. Preferably, a resilient disk or washer 14 is interposed between the end of the set screw 15 and the upper end of the needle 13. The set screw 15 extends into the upper end of the tube 10 and is threadingly mounted in the base of a cup-shaped magnetizable frame 16 which encases the sides and one end of the spool 9 and engages at its lower end the outer periphery of the end shield 11. Thus, in a recording or reproducing head provided with a magnetizable shield 11, the coil spool 9 and needle 13 are almost completely enclosed in a magnetizable casing, only the point of the needle extending through the aperture in the end shield 11.

The magnetizable frame 16 is formed of any suitable highly permeable magnetizable material, such as Permalloy, Nicaloi or Numetal, and is held in place on the spool 9 by a pair of bolts 17 at the upper end of the head. The coil spool 9 carries a winding 16 surrounding the needle for the greater portion of its length and having a pair of leads 19 extending through a suitable aperture in the side of the cup-shaped frame 16. In a recording head where it is desired to provide a unidirectional magnetic bias, a direct current may be superposed upon the signal modulated current applied to the winding 18 or, if desired, a separate direct current winding may be mounted upon the spool 9. Such a winding is shown at 18*a* in connection with the recording head 5 shown diagrammatically at Fig. 6.

The recording and reproducing heads 5 and 6 are mounted in opposite sides of the end of the movable arm 3, as shown in detail at Figs. 2 and 3. The arm 3 comprises an elongated hollow insulating support 20 open at the bottom and having axially mounted therein a rotatable shaft 21. The elongated support 20 is pivotally and rotatably mounted adjacent one end upon the base 4 by means of a T-shaped plate 22. The plate 22 is rotatably mounted upon a vertical spindle 23 in the base 4 and is provided at opposite ends of its cross arm with upstanding lugs 24 pivotally connected to the sides of the support 20 by pointed pins 25, thereby to provide both for pivotal movement of the arm 3 about a horizontal axis and for rotation about a vertical axis.

The rotatable shaft 21 carried by the support 20 is journalled in the outer end of the support 20 and extends beyond the end to carry a reversible holder 26 in which the recording and reproducing heads 5 and 6 are mounted.

The holder 26 is pinned to the shaft 21 to rotate therewith, and is preferably formed of any suitable molded plastic insulating material. The opposite end of the shaft 21 is journalled upon a pin 27 projecting from the end of a threaded shaft 28. The shaft 28 is, in turn, journalled at its opposite end in the other end of the support 20 and projects beyond the end of the support 20 to accommodate a knurled adjusting knob 29. Intermediate its ends, the threaded shaft 28 carries a counterweight 30 threadingly mounted upon the shaft 28 and held against rotation, but not against longitudinal movement, by engagement with a suitable stop (not shown) on the support 20.

The shaft 21 is provided with detent means so arranged that the shaft may be positioned only in two alternative positions spaced apart by 180°. This means comprises a pin 31 adjustably mounted on the T-shaped plate 22 remote from the pivot pins 25 and arranged for engagement with oppositely disposed holes 32 in the shaft 21. By this arrangement, the movable arm 3 may be lowered for engagement of a needle with the record surface only when one or the other of the recording and reproducing heads 5 and 6 is in proper position. When the arm is raised about the pivot pins 25, the shaft 21 is disengaged from the detent pin 31.

The head holder 26 is cylindrically recessed at its upper and lower sides to receive the recording and reproducing heads 5 and 6. The heads are held in place by set screws 33 in the end of the holder, and small holes 34 connect the base of each recess with the other side of the holder to provide access to the set screws 15 at the top of each head. The heads 5 and 6 are in side-by-side relation in the holder 26 and the cylindrical recesses in the holder are tilted slightly with respect to the axis of the shaft 21 so that each head will be in an optimum position when its needle is in engagement with the record disk 2.

From the foregoing description, it will be evident that the recording and reproducing heads 5 and 6 are alternatively positioned for engagement with the surface of the record disk 2, and that the heads may be interchanged by raising the arm 3 about the pivot pins 25 to disengage the detent 31, 32, then reversing the head holder 26 by 180° rotation of the shaft 21, and finally lowering the arm 3 so that the shaft 21 is again locked in position by the detent pin 31.

The rotatable shaft 21 is also used to provide a simple drum type controller arranged to make suitable electrical connection between the recording and reproducing heads and a suitable radio receiver and signal amplifier. For this purpose, the shaft 21 is preferably formed of an insulating material and provided on opposite sides with a plurality of pairs of conducting segments 34, 35, 36 and 37 shown in greater detail at Fig. 4. The segments 34—37 are held in position on the shaft by set screws 38 and provided with terminal connectors 39 extending into the hollow interior of the shaft 21 for connection with the necessary lead wires. The inner surface of the supporting arm 20 is provided with a plurality of pairs of U-shaped spring contacts 40, 41 and 42 fastened to the arm 20 by bolts 43 and arranged to engage those conducting segments 34—37 which are momentarily positioned at the upper side of the shaft 21.

The controller segments 34—37 on the shaft 21 and the contacts 40—42 are shown schematically at Fig. 6 in a suitable circuit connection to a conventional radio receiving apparatus. At Fig. 6, I have shown diagrammatically a radio receiving apparatus comprising an aerial 44 connected to supply radio frequency energy to a radio frequency amplifier and signal detector shown in block form at 45. The detector output is connected to the conducting segments 34 on the shaft 21. The conducting segments 35 on the shaft 21 are connected to the lead wires from the coil 18 of the recording head 5. The lead wires from the coil 18 of the reproducing head 6 are connected to the shaft segments 36 on the shaft 21. The complete apparatus includes also a signal amplifier 47 which may be of the electron discharge type ordinarily used in home radio receiving sets and a signal reproducing apparatus, such as a loud speaker 48. The input of the signal amplifier 47 is connected to the stationary contacts 40 shown in engagement with the conducting segments 36. The signal amplifier output is connected to the stationary contacts 41 and the loud speaker input is connected to the stationary contacts 42. In the position of the shaft 21 shown in the drawing, the shaft segments 37 bridge the contacts 41 and 42.

It will now be evident from Fig. 6 that, with the shaft 21 positioned as shown, audio frequency oscillations from the reproducing head 6 are impressed upon the input of the signal amplifier 47, and from the output of the amplifier upon the loud speaker 48. If, on the other hand, it is desired to utilize the magnetic recording apparatus for recording purposes, the shaft 21 is rotated 180° about a horizontal axis until the conducting segments 34 and 35 shown in the drawing at the lower side of the shaft 21 are brought into engagement with the stationary contacts 40—42. In this position, the loud speaker 48 is disconnected, the output of the detector in the receiving apparatus 45 is connected to the input of the signal amplifier 47 and the coil 18 of the recording head 5 is connected to the output of the signal amplifier.

In describing the operation of my improved magnetic recording apparatus, let it first be assumed that the shaft 21 of the movable arm 3 is in its recording position, so that the head 5 is in engagement with the record surface. In this position, signal oscillations are impressed upon the coil 18 of the head 5 from the output of the signal amplifier 42 of Fig. 6 and the magnetization of the needle 13 varies in frequency and intensity in accordance with the frequency and intensity of the impressed signal. Such magnetization is impressed upon the recording surface 8 of the magnetic disk 2 by reason of the fact that the magnetic circuit of the head includes a portion of the disk. Referring particularly to Fig. 5, the magnetic circuit may be followed from the point of the needle through the recording surface 8 at the base of the slot engaged by the needle, and then in a distributed path through the high permeability supporting disk 7, surrounding portions of the recording surface 8, and back through air to the magnetic frame 16 forming the casing for the head. The upper end of the frame 16 is magnetically linked to the needle through the set screw 15 and the magnetizable spool liner 10. It will of course be understood that, in the event that a varnish coated needle is used as described hereinbefore, the varnish is very rapidly worn off the tip of the needle, so that no permanent air gap is interposed between the tip of the needle and the record surface.

In the flux path described above, the magnetic flux is considerably concentrated at the tip of the needle, and this concentration is maintained as the flux passes through the recording surface 8. This constricting effect arises from the fact that the flux evidences very little tendency to spread out from the point of the needle after it passes into the surface 8 because of the high reluctance of the coating 8 relative to the reluctance of the record base 7. The distribution of the flux in the record base 7 is unimportant, and the coercive force of this base is sufficiently low that no appreciable amount of magnetism is retained after passage of the needle. It will be evident therefore that by utilizing a material of relatively high reluctance in the recording surface layer, I am able to restrict the path of the flux passing through the surface layer and thereby to minimize interference between the magnetization impressed upon the record surface in the adjacent and substantially parallel paths defined by the closely spaced grooves. Furthermore, the high coercive force of the surface layer 8 ensures that a permanent record of the instantaneous magnetization will be retained between the bottom of the groove and the top of the magnetically soft base disk 7. After the flux enters the base 7, it spreads out to such an extent that no significant magnetization is impressed upon the record surface by the returning flux.

The high reluctance of the surface layer 8 is desirable not only for its constricting effect upon the flux passing through the surface layer, but also for its effect in reducing the noise resulting from surface roughness in the record. It will of course be appreciated that, in even the most carefully prepared surface, a certain amount of unevenness exists which produces an irregular variation of the slight air gap between the tip of the needle and the record surface. Such variation in the reluctance of the magnetic path tends to produce noise and distortion. However, the reluctance of the sintered magnetic oxide mixture which I have described heretofore is relatively so large, even in the very thin coating described, that air gap variation by surface roughness is reduced to a relatively minor effect. This noise level reduction is appreciable only when the permeability of the recording surface 8 is less than about 7. The mixed magnetic oxide and binder described hereinbefore has a permeability of about 2. With such low permeability the noise reduction effect is quite marked.

From the foregoing description of the recording operation, it will be evident that the magnetizable end shield 11 performs no useful function in recording. The shield 11, when present in the recording head, provides a shunt path for the useful flux from the tip of the needle to the head casing 16. It is therefore preferable to omit the shield 11 in the recording head, so that the useful flux will not be shunted away from the record 2. It is possible, however, to provide a shield 11 so thin that it may easily be saturated by the unidirectional biasing flux supplied by the biasing winding 18*a* on the recording head. When so saturated, the shield 11 has little undesired shunting effect upon the useful flux.

If now the head holder 26 is reversed, it will be evident from Fig. 6 that the amplifier and detector 45 and the recording head 5 are both disconnected, while the reproducing head 6 is connected through the signal amplifier 47 and the drum controller to the loud speaker 48. In reproducing operation, the head 6 traverses the record disk 2 and the signal modulated magnetization of the surface layer 8 beneath the groove engaged by the needle modulates the magnetization of the needle 13, thereby to induce signal frequency currents in the winding 18. These signal frequency currents are amplified in the signal amplifier 47 and impressed upon the loud speaker 48.

In reproducing operation, the magnetizable end plate 11 acts as a magnetic shunt to prevent cross talk from those portions of the sound track immediately adjacent the groove engaged by the needle. Without such a magnetizable end shield, magnetic flux from grooves beneath the head and adjacent the working groove may enter the needle and induce undesired signal oscillations in the recording coil. The magnetizable end plate 11 on the reproducing head shields the needle from such undesired magnetization by providing a shunt path through the shield 11 for flux from grooves adjacent the working groove. Thus, with a magnetic end shield or shunt extending laterally from the tip of the needle, the reproducing head is substantially entirely enclosed in a magnetizable casing, so that no magnetic flux can link the coil 18 except that entering through the small needle aperture at the center of the shield.

A magnetized record disk may be erased either by magnetizing the disk uniformly in the direction of its thickness, or by completely demagnetizing the disk. Erasure by uniform magnetization in the direction of the thickness may be very simply accomplished by traversing the surface of the disk with a small permanent magnet, although of course if desired any other source of constant magnetization, such as an electromagnet, may be used. Preferably, the erasing magnet is sufficiently broad to cover a number of adjacent grooves on the record, and the erasing operation is carried out merely by moving the magnet radially across the disk while the disk is rotating. It will be understood that, when erasure is accomplished by uniform magnetization in one direction, recording is carried out upon the portion *ab* of the hysteresis loop shown at Fig. 7.

Erasing may also be carried out by exposing the record to an alternating flux of gradually diminishing intensity. At Fig. 8, I have shown an erasing head arranged to effect demagnetization in this manner. The head comprises a support or base 50 in which are mounted two similar, but oppositely disposed, bar magnets 51 and 52 in parallel spaced relation with opposite pole faces in substantially the same plane. Between the magnets 51 and 52 is mounted a needle 53 having its tip extending slightly beyond the plane of the pole faces of the magnets 51 and 52. In operation, the erasing head of Fig. 8 is mounted upon the end of a movable arm, such as the arm 3 of Fig. 1, with the needle 53 riding in the spiral sound track. The magnets 51 and 52 are aligned longitudinally of the groove engaged by the needle 53 so that the magnets traverse the groove in following relation. In operation, each portion of the sound track engaged by the needle 53 is magnetized uniformly in one direction by the leading magnet as the head approaches that portion and the magnetization is immediately reversed by the trailing magnet as the head leaves the portion. As the record rotates 360°, the same operation again takes place, but with slightly less intensity because the needle 53 is now engaging the adjacent groove. Thus, as the erasing head progresses in the spiral groove from the outer to the inner periphery of the record, each portion of the record surface experiences a number of successive reversals of its magnetization with a gradually decreasing intensity.

At Fig. 9 I have shown a combined magnetic recording and reproducing head generally similar to that of Fig. 5, but in which the magnetic end shield 11 is easily removable for use of the head without the shield in recording. In this embodiment of the invention, the casing 16 covers a portion of the tapered end of the spool 9 and is open at the top for insertion of the spool. A magnetic end cap 16*a* is placed over the spool after assembly in the casing. A spring 14*a* is shown between the set screw 15 and the top of the needle 13. The spool lines 10 may be integral with the cap 16*a*. The coil 18*b* includes recording, reproducing and biasing windings. The magnetic shield 11 is mounted upon an arm 55 of non-magnetic material carried by a rotatable shaft 56 journalled in a fixed bracket 57. The shaft 56 is movable longitudinally in the bracket and is biased to the position shown by a spring 58 between the bracket 57 and a knurled knob 59 on the shaft. To remove the shield 11 from the head, the head and attached bracket 57 are raised from the record, the shaft 56 depressed to release the shield 11, and the arm 55 turned through 180 degrees. When the shield 11 is removed from the head, the spring 14*a* moves the needle 14 downward slightly to seat upon the spool 9. Suitable detent means may be provided to determine alternative operative and inoperative positions of the shield 11.

With a combined head such as that of Fig. 9, the end portion 26 of the swivel arm 3 need not be reversible, and the rotatable shaft 21 will not be available for controlling the winding connections. In this case, however, the controller contacts may be mounted upon the shaft 56, as at 60 in Fig. 9.

At Fig. 10, I have shown schematically an arrangement wherein my magnetic reproducing apparatus may be utilized as a musical instrument for producing desired sounds under the control of an operator. At Fig. 10, the record disk 2 is provided with a plurality of separate concentric sound tracks 61, each of which is magnetized to produce a separate note of uniform frequency. Since, as previously pointed out, the grooves 61 may be spaced as closely as .015 inch, it is evident that all the notes of the musical scale may be recorded upon a single record. A plurality of reproducing heads 62 are mounted upon a common support and so positioned that one head cooperates with each groove 61. The heads 56 are connected in parallel circuit relation through manually operable keying switches 63 to supply one or more of the recorded notes to a common amplifying and reproducing apparatus 64.

It will now be evident that my new and improved recording and reproducing apparatus is inexpensive and easy to manufacture, and is simple, though versatile and durable, in operation. Record disks or cylinders made by the method described herein are particularly well suited for home recording and reproducing apparatus, since the records may be utilized over and over again by the simple expedient of erasing the previous recording with a small permanent magnet. The records are durable in that the high coercive force recording surface will not peel off, and the records can stand considerable shock, such as dropping and the like, without appreciable change in the fidelity of their reproduction. Furthermore, the confinement of the magnetic field in recording operation, effected by the use of a thin recording surface having high coercive force and high reluctance, permits the use of relatively slow turntable speeds in both recording and reproducing. I prefer to use 78 revolutions per minute, the usual phonograph turntable speed, for both recording and reproducing operation although speech has been very satisfactorily recorded and reproduced on my apparatus at 33 revolutions per minute. The magnetic end shield on the reproducing head has been found very successful in eliminating objectionable cross talk and thereby permitting closer spacing of the adjacent grooves and smaller record sizes for a desired recording time. The slow speed operation of my record, of course, contributes also to diminution in the size of the record for a given recording time. The fact that separate heads are desirable for recording and reproducing facilitates the controller arrangement which I have shown in connection with the shaft 21, so that my apparatus is particularly easily adaptable for alternative connection either to the incoming stages of a radio receiving set for recording purposes or to the signal amplifying stages of the set for reproducing purposes. Obviously, further controller contacts may be added if desired. One such additional contact may, for example, be used to control the biasing winding 18*a* on the recording head. Additional contacts may be provided to connect the detector 45 directly to the amplifier 47, thereby to cut out the recording apparatus and provide for direct receiving operation of the radio apparatus.

While I have shown only certain preferred embodiments of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. A magnetic recording and reproducing needle adapted to be seated in a holder having a magnetic portion at the seat therein and adapted for cooperation with a magnetic record medium, said needle comprising one end for communicating magnetic flux modulated in amplitude over a given range with said medium, said needle comprising material offering a high permeability and low coercivity to communication of said flux over said range, said needle being coated with a wear-resistant layer of hard metal, and an outer coating of non-magnetic soft material to interpose a high reluctance gap between said needle and said magnetic portion of said seat, said outer layer being adapted to be worn off at the region of contact of said needle with a relatively movable magnetic recording medium.

2. A magnetic recording and reproducing needle adapted for cooperation with a magnetic record medium, said needle comprising one end for communicating magnetic flux modulated over a given range of amplitudes with said medium, said needle comprising material offering a high permeability and low coercivity to communication of said flux over said range, said end comprising a first coating of a non-magnetic wear-resisting material, and a second coating of a nonmagnetic mechanically soft material to be worn away upon contact with said medium.

3. A magnetic recording and reproducing needle adapted for physical contact cooperation with a magnetic record medium, said needle comprising a tapered end to communicate magnetic flux modulated over a given range of amplitudes with said medium, said needle comprising material offering a high permeability and low coercivity to communication of said flux over said range, said tapered end consisting of a first coating of a non-magnetic wear-resisting material, and a second coating of a nonmagnetic mechanically soft material to be worn away upon contact with said medium.

4. A magnetic recording and reproducing needle adapted for cooperation with a magnetic record medium, said needle comprising one end for communicating magnetic flux modulated over a given range of amplitudes with said medium, said needle comprising material offering a high permeability and low coercivity to communication of said flux over said range, said needle comprising a chromium plating on said end coated with a non-magnetic, mechanically soft material.

5. A magnetic recording and reproducing needle adapted for cooperation with a magnetic record medium, said needle comprising a tapered end to communicate magnetic flux modulated over a given range of amplitudes with said medium, said needle comprising material offering a high permeability and low coercivity to communication of said flux over said range, said needle comprising a chromium plated tapered end coated with an non-magnetic organic material.

HAROLD T. FAUS.

REFERENCES CITED

The following references are of record in the file of this patent:

UNITED STATES PATENTS

| Number | Name | Date |
|---|---|---|
| 1,792,494 | Harrison et al. | Feb. 17, 1931 |
| 2,078,357 | Woodmonsee et al. | Apr. 27, 1937 |
| 2,361,753 | Eilenberger | Oct. 31, 1944 |
| 2,433,207 | Eilenberger | Dec. 23, 1947 |

FOREIGN PATENTS

| Number | Country | Date |
|---|---|---|
| 291,755 | Great Britain | July 5, 1928 |
| 18,627/29 | Australia | Sept. 11, 1929 |
| 393,571 | Great Britain | Sept. 5, 1931 |